(12) United States Patent
Lee

(10) Patent No.: US 7,384,276 B2
(45) Date of Patent: Jun. 10, 2008

(54) ELECTRONIC DEVICE WITH HOT SWAP CAPABILITY

(75) Inventor: Shao-Ming Lee, Nan-Tou Hsien (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 0 days.

(21) Appl. No.: 11/684,014

(22) Filed: Mar. 9, 2007

(65) Prior Publication Data

US 2008/0034143 A1    Feb. 7, 2008

(30) Foreign Application Priority Data

Aug. 3, 2006   (TW) .............................. 95213673 U

(51) Int. Cl.
*H01R 12/00*   (2006.01)
(52) U.S. Cl. ...................................... 439/79; 439/76.1
(58) Field of Classification Search .................. 439/62, 439/76.1, 79
See application file for complete search history.

(56) References Cited

U.S. PATENT DOCUMENTS 6,188,571 B1* 2/2001 Roganti et al. ............. 361/685
6,822,874 B1* 11/2004 Marler ....................... 361/762
7,035,097 B2* 4/2006 Petrov et al. ............... 361/685

* cited by examiner

*Primary Examiner*—Khiem Nguyen
(74) *Attorney, Agent, or Firm*—Butzel Long

(57) ABSTRACT

An electronic device includes a casing and a board assembly. The casing defines an accommodating space, and a slot that is in spatial communication with the accommodating space. The board assembly includes a circuit board and a hot-swap port. The circuit board is mounted in the accommodating space in the casing. The hot-swap port is coupled electrically to and is mounted directly on the circuit board, extends into the slot in the casing, and is adapted to be connected electrically to a hot-swap component received in the slot in the casing.

6 Claims, 4 Drawing Sheets

ELECTRONIC DEVICE WITH HOT SWAP CAPABILITY

CROSS-REFERENCE TO RELATED APPLICATION

This application claims priority of Taiwanese application no. 095213673, filed on Aug. 3, 2006.

BACKGROUND OF THE INVENTION

1. Field of the Invention

The invention relates to an electronic device. More particularly, the invention relates to an electronic device that supports hot swapping.

2. Description of the Related Art

FIG. 1 illustrates a conventional computer server 1 that includes a server casing 11, a motherboard 12, a bracket 16, a daughter board 13, and three cables 15. The motherboard 12 is mounted in the server casing 11. The bracket 16 is mounted in the server casing 11 and is disposed adjacent to an edge of the motherboard 12. The daughter board 13 is mounted on the bracket 16 and includes a pair of hot-swap ports 131. Each of the cables 15 interconnects the motherboard 12 and the daughter board 13.

In use, while the conventional computer server 1 is in operation, hot-swap components 14, such as hard disk drives, may be plugged and unplugged into and from the hot-swap ports 131 of the daughter board 13, during which the bracket 16 serves as a support for the daughter board 13.

Although the aforementioned conventional computer server 1 achieves its intended purpose, it includes dispensable components, such as the bracket 16 and the cables 15, which incur difficulties during assembly and extra costs.

SUMMARY OF THE INVENTION

Therefore, the object of the present invention is to provide an electronic device that can overcome the aforesaid drawback of the prior art.

According to one aspect of the present invention, an electronic device comprises a casing and a board assembly. The casing defines an accommodating space, and a slot that is in spatial communication with the accommodating space. The board assembly includes a circuit board and a hot-swap port. The circuit board is mounted in the accommodating space in the casing. The hot-swap port is coupled electrically to and is mounted directly on the circuit board, extends into the slot in the casing, and is adapted to be connected electrically to a hot-swap component received in the slot in the casing.

According to another aspect of the present invention, a board assembly for an electronic device comprises a circuit board and a hot-swap port. The electronic device includes a casing that defines a slot. The circuit board is adapted to be mounted in the casing of the electronic device. The hot-swap port is coupled electrically to and is mounted directly on the circuit board, is adapted to extend into the slot in the casing of the electronic device, and is adapted to be connected electrically to a hot-swap component received in the slot in the casing of the electronic device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
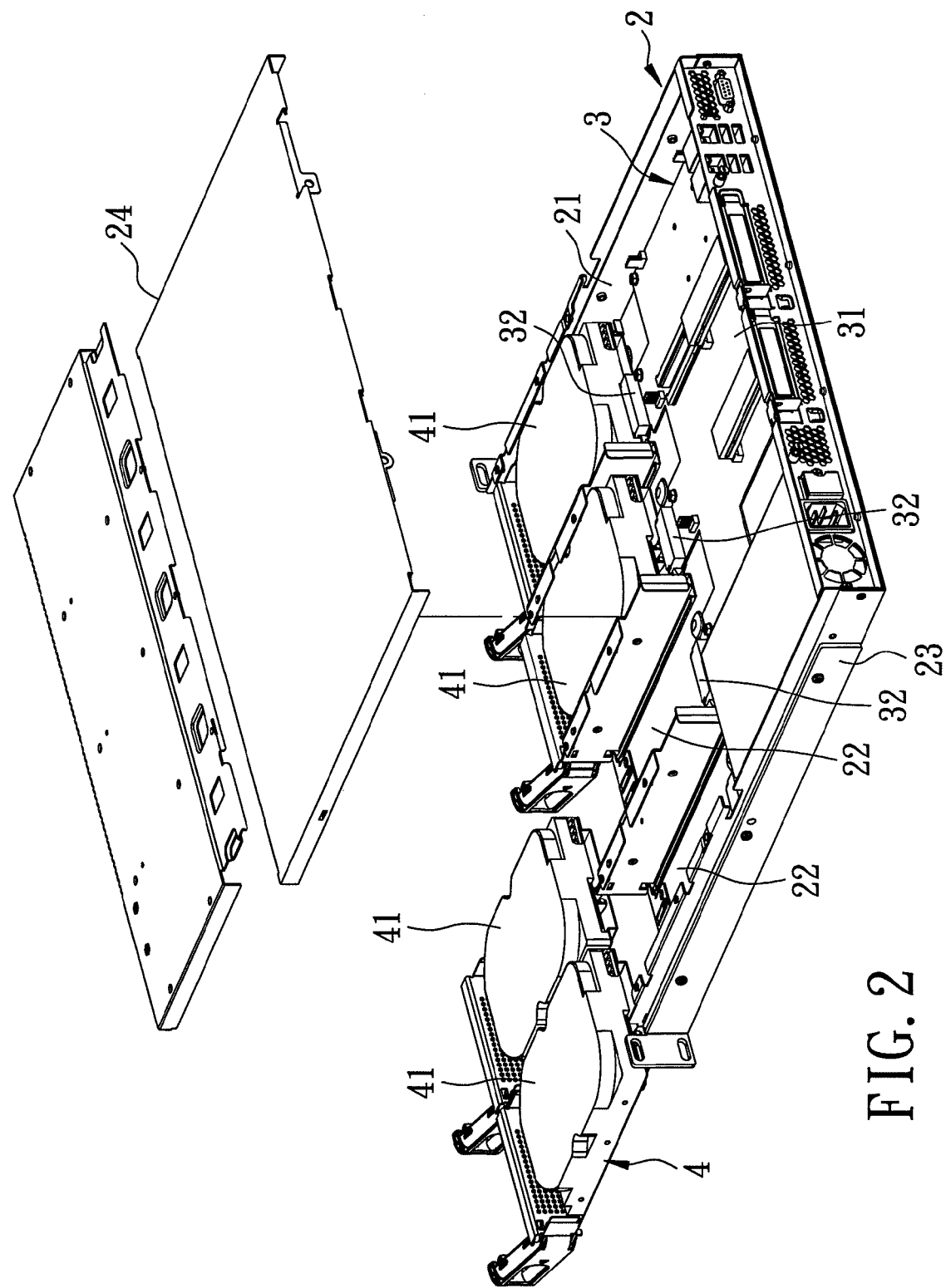
FIG. 2 is a perspective view of the preferred embodiment of an electronic device according to the present invention.

Referring to FIG. 2, the preferred embodiment of an electronic device according to this invention includes a casing 2 and a board assembly 3.

The casing 2 defines an accommodating space 21, and a plurality of slots 22, each of which is in spatial communication with the accommodating space 21.

Figure 3:
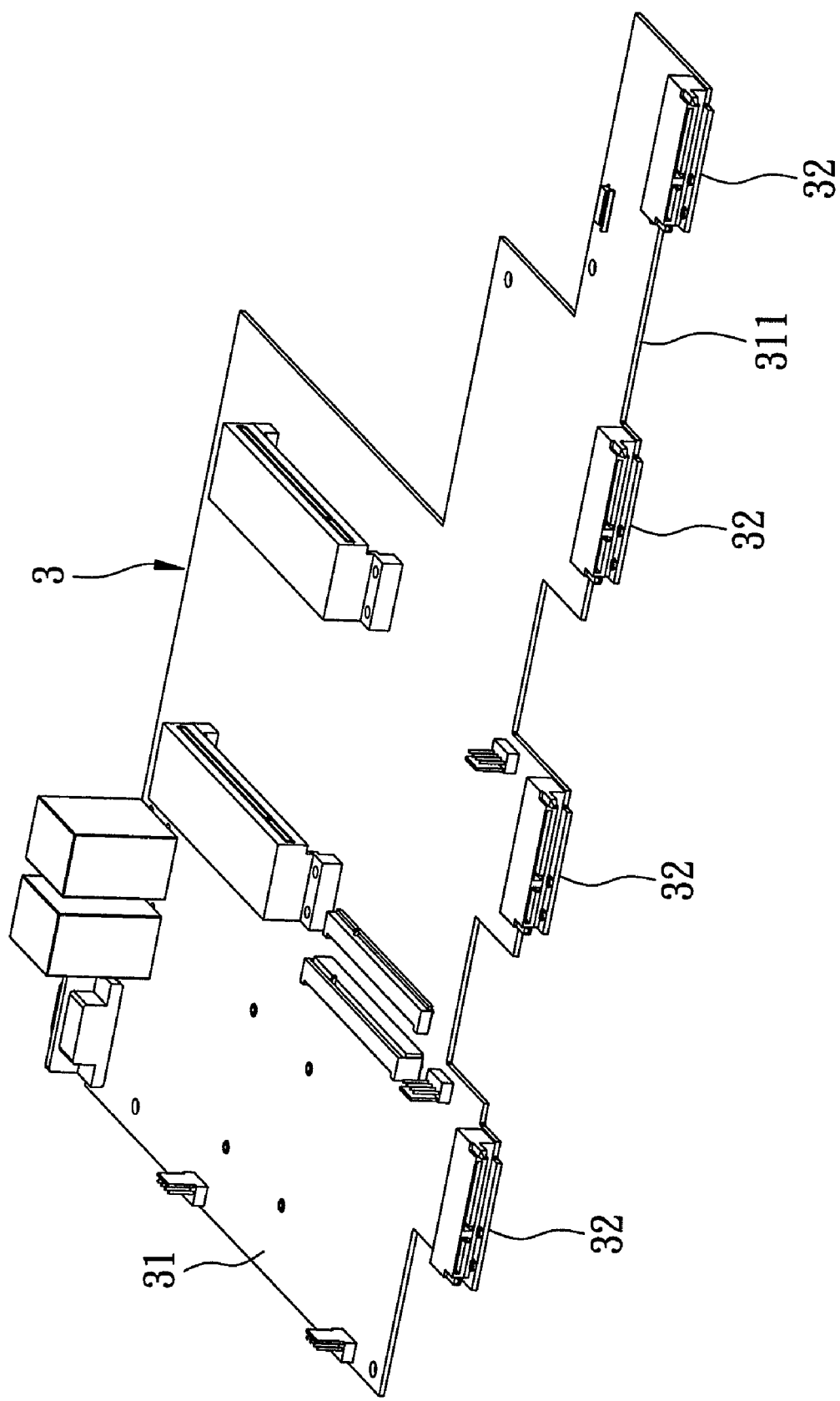
FIG. 3 is a perspective view to illustrate a board assembly of the preferred embodiment.

With further reference to FIG. 3, the board assembly 3 includes a circuit board 31 and a plurality of hot-swap ports 32. The circuit board 31 is mounted in the accommodating space 21 in the casing 2, and has an edge 311 disposed adjacent to the slots 22 in the casing 2. Each of the hot-swap ports 32 is coupled electrically to and is mounted directly on the circuit board 31, is disposed on the edge 311 of the circuit board 31, and extends into a respective one of the slots 22 in the casing 2. In this embodiment, each of the hot-swap ports 32 complies with an advanced technology attachment (ATA) interface standard. In an alternative embodiment, each of the hot-swap ports 32 complies with a serial ATA (SATA) interface standard, a small computer system interface (SCSI) standard, or a serial SCSI (SAS) standard.

Each of the hot-swap ports 32 is connected electrically to a respective one of hot-swap components 41, such as a hard disk drive, received in a respective one of the slots 22 in the casing 2, in a manner that will be described hereinafter.

Figure 4:
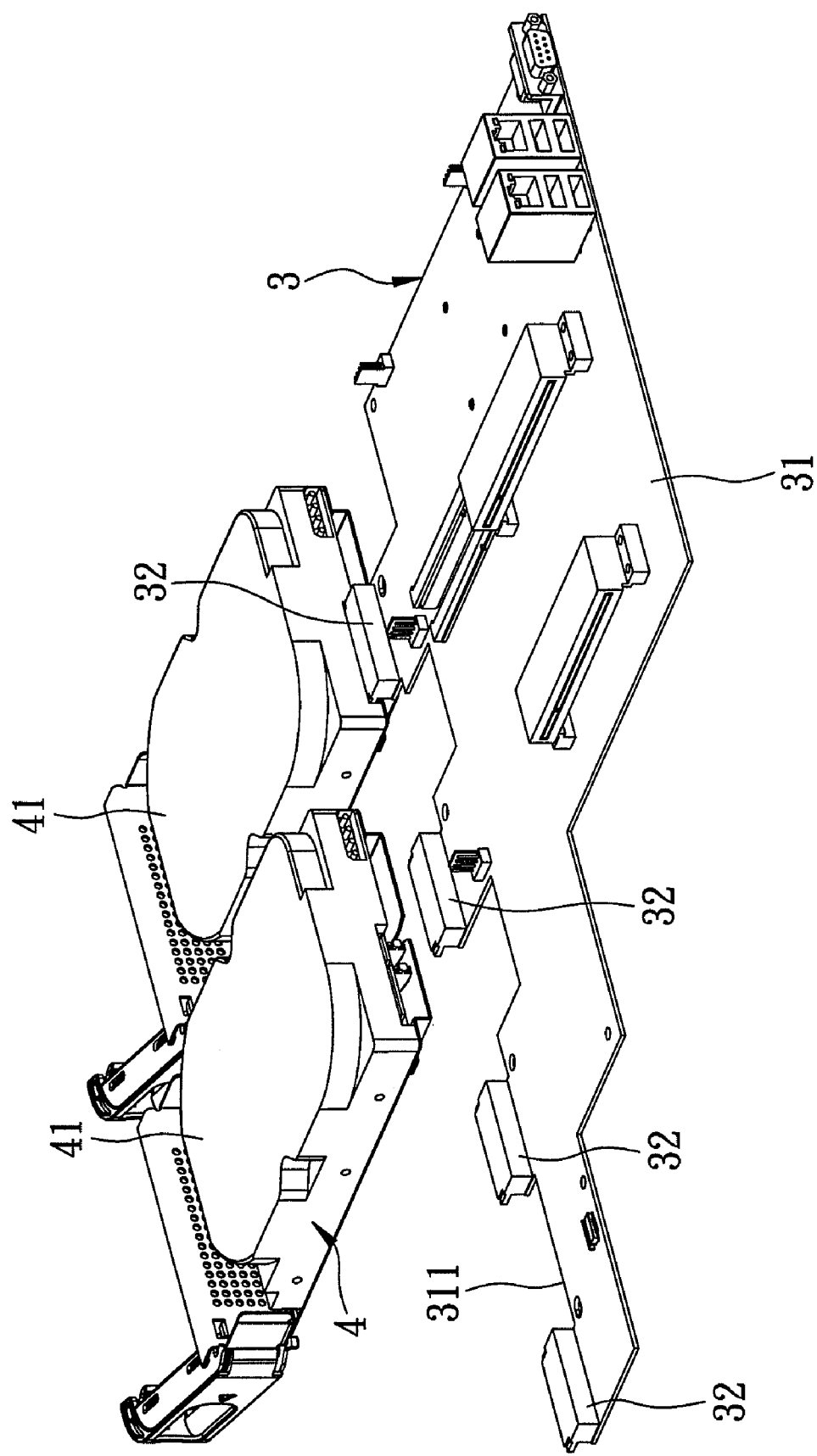
FIG. 4 is a perspective view to illustrate installation and removal of hot-swap components to and from the preferred embodiment.

In use, with further reference to FIG. 4, when it is desired to install the hot-swap components 41 to the electronic device of this invention, each of the hot-swap components 41 is first inserted into a respective one of the slots 22 in the casing 2 and is then plugged into a respective one of the hot-swap ports 32. Thereafter, when it is desired to remove the hot-swap components 41, each of the hot-swap components 41 is first unplugged from the respective one of the hot-swap ports 32 and is pulled out from the respective one of the slots 22.

Figure 1:
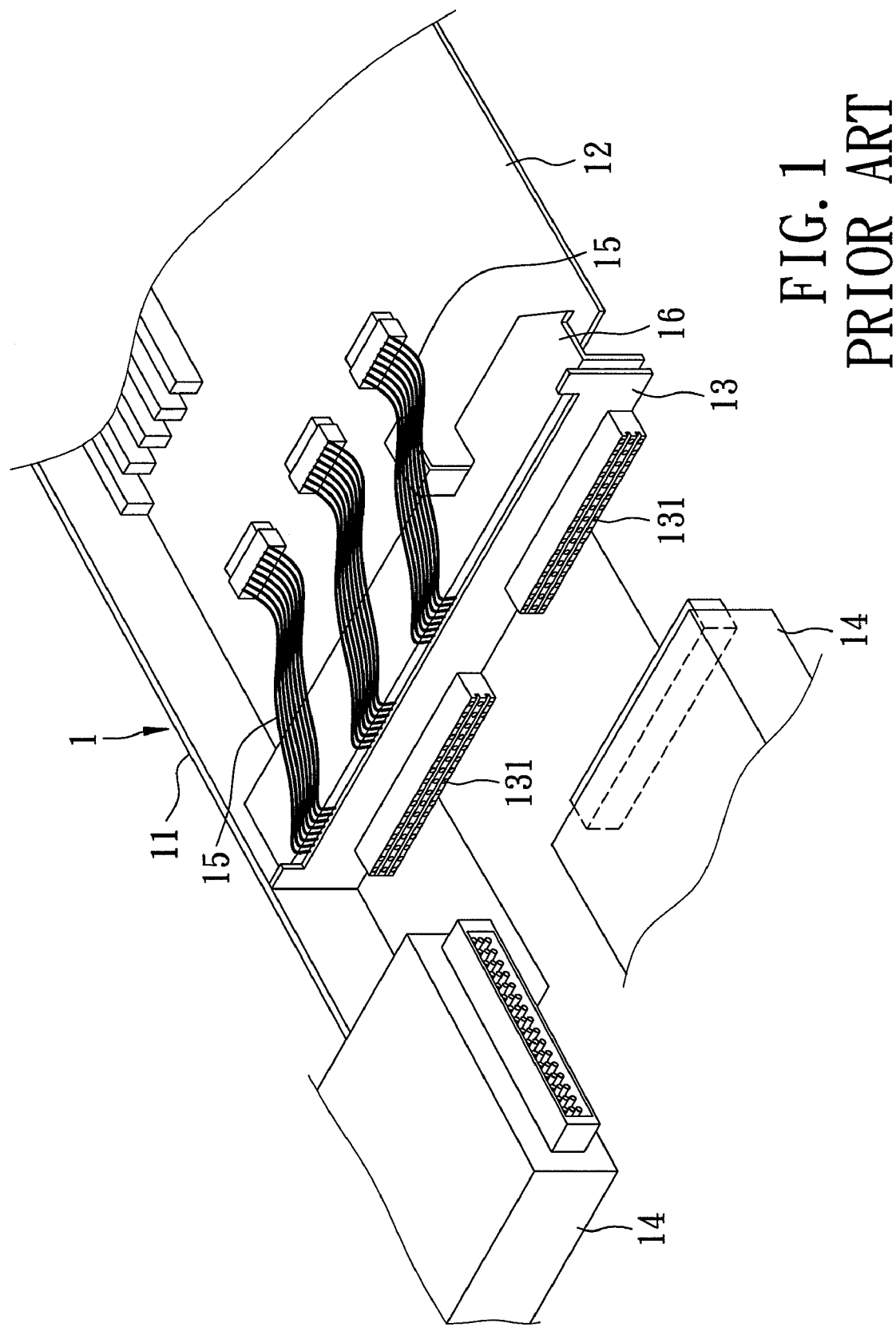
FIG. 1 is a cutaway perspective view of a conventional electronic device.

It is noted that the installation and removal of the hot-swap components 41 may be performed while the electronic device of this invention is in operation. Moreover, since the hot-swap ports 32 are coupled electrically to and are mounted directly on the circuit board 31, the electronic device of this invention may be dispensed with the cables 15 (see FIG. 1). Further, since the hot-swap ports 32 are mounted directly on the circuit board 31, the circuit board 31 serves as a support for the hot-swap ports 32 during installation and removal of the hot-swap components 41. As such, the electronic device of this invention may be dispensed with the bracket 16 (see FIG. 1). The electronic device of this invention is therefore relatively easy to assemble and costs less to manufacture.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device comprising:
   a casing defining an accommodating space and a slot that is in spatial communication with said accommodating space; and
   a board assembly including
      a motherboard mounted in said accommodating space in said casing,
      a hot-swap port coupled electrically to and mounted directly on said motherboard extending into said slot in said casing, and adapted to be connected electrically to a hot-swap component received in said slot in said casing; and
      a hot-swap component for attachment to said motherboard.

2. The electronic device as claimed in claim 1, wherein said motherboard has an edge that is disposed adjacent to said slot, said hot-swap port being disposed on said edge of said motherboard.

3. The electronic device as claimed in claim 1, wherein said hot-swap port complies with one of an advanced technology attachment (ATA) interface standard, a serial ATA (SATA) interface standard, a small computer system interface (SCSI) standard, and a serial attached SCSI (SAS) standard.

4. A board assembly for an electronic device, the electronic device including casing that defines a slot, said board assembly comprising:
   a motherboard adapted to be mounted in the casing of the electronic device;
   a hot-swap port coupled electrically to and mounted directly on said motherboard, adapted to extend into the slot in the casing of the electronic device, and adapted to be connected electrically to a hot-swap component received in the slot in the casing of the electronic device; and
   a hot-swap component for attachment to said motherboard.

5. The board assembly as claimed in claim 4, wherein said motherboard has an edge that is adapted to be disposed adjacent to the slot in the casing, said hot-swap port being disposed on said edge of said motherboard.

6. The board assembly as claimed in claim 4, wherein said hot-swap port complies with one of an advanced technology attachment (ATA) interface standard, a serial ATA (SATA) interface standard, a serial ATA (SATA) interface standard, a small computer system interface (SCSI) standard, and a serial attached SCSI (SAS) standard.

* * * * *